(12) United States Patent
Haase et al.

(10) Patent No.: US 11,307,398 B2
(45) Date of Patent: Apr. 19, 2022

(54) METHOD FOR GENERATING AND ANALYZING AN OVERVIEW CONTRAST IMAGE

(71) Applicant: Carl Zeiss Microscopy GmbH, Jena (DE)

(72) Inventors: Daniel Haase, Zoellnitz (DE); Thomas Ohrt, Golmsdorf (DE); Markus Sticker, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 174 days.

(21) Appl. No.: 16/618,773

(22) PCT Filed: May 15, 2018

(86) PCT No.: PCT/EP2018/062483
§ 371 (c)(1),
(2) Date: Dec. 2, 2019

(87) PCT Pub. No.: WO2018/219632
PCT Pub. Date: Dec. 6, 2018

(65) Prior Publication Data
US 2020/0088984 A1 Mar. 19, 2020

(30) Foreign Application Priority Data
May 30, 2017 (DE) .......................... 102017111718.0

(51) Int. Cl.
*G02B 21/06* (2006.01)
*G02B 21/12* (2006.01)
(Continued)

(52) U.S. Cl.
CPC ......... *G02B 21/125* (2013.01); *G02B 21/086* (2013.01); *G02B 21/367* (2013.01)

(58) Field of Classification Search
CPC .. G02B 21/00; G02B 21/0004; G02B 21/002; G02B 21/0024; G02B 21/0032;
(Continued)

(56) References Cited

U.S. PATENT DOCUMENTS 9,835,839 B2 12/2017 Hein
2012/0154571 A1* 6/2012 Bryll .................... G06K 9/2027
348/94

(Continued)

FOREIGN PATENT DOCUMENTS

DE 10 2011 114 336 A1 3/2013
JP 2011-004638 A 1/2011
(Continued)

OTHER PUBLICATIONS

Guo, Kaikai, et al., "Fourier Ptychography for Brightfield, Phase, Darkfield, Reflective, Multi-Slice, and Fluorescence Imaging," *IEEE Journal of Selected Topics in Quantum Electronics*, vol. 22, No. 4, 12 pages (Jul./Aug. 2016).

(Continued)

*Primary Examiner* — Arnel C Lavarias
(74) *Attorney, Agent, or Firm* — Christensen, Fonder, Dardi & Herbert PLLC

(57) ABSTRACT

A method for generating and analyzing an overview contrast image of a specimen carrier and/or of specimens situated on a specimen carrier. A specimen carrier arranged at least partially in the focus of a detection optical unit is illuminated in transmitted light using a two-dimensional, array-like illumination pattern. At least two overview raw images are detected using different illuminations of the specimen carrier, and, according to information to be extracted from the overview contrast image, a combination algorithm is selected by means of which the at least two overview raw images are combined to form the overview contrast image.

(Continued)

According to information to be extracted from the overview contrast image, an image evaluation algorithm is selected by means of which the information is extracted.

20 Claims, 6 Drawing Sheets

(51) Int. Cl.
  *G02B 21/08* (2006.01)
  *G02B 21/36* (2006.01)
(58) Field of Classification Search
  CPC .............. G02B 21/0052; G02B 21/006; G02B 21/0076; G02B 21/008; G02B 21/06; G02B 21/08; G02B 21/086; G02B 21/10; G02B 21/12; G02B 21/125; G02B 21/36; G02B 21/361; G02B 21/365; G02B 21/367
  USPC ....... 359/362, 363, 368, 369, 385, 388, 389, 359/390
  See application file for complete search history.

(56) References Cited

U.S. PATENT DOCUMENTS

| | | | |
|---|---|---|---|
| 2013/0155499 A1 | 6/2013 | Dixon | |
| 2014/0354796 A1 | 12/2014 | Hein | |
| 2016/0202460 A1 | 7/2016 | Zheng | |
| 2016/0216208 A1 | 7/2016 | Kim et al. | |
| 2017/0010455 A1 | 1/2017 | Tsujimoto | |
| 2017/0205617 A1 | 7/2017 | Stoppe et al. | |
| 2017/0307530 A1 | 10/2017 | Mikami | |
| 2019/0384962 A1* | 12/2019 | Hayut | G06K 9/0014 |
| 2021/0149169 A1* | 5/2021 | Leshem | G02B 21/367 |

FOREIGN PATENT DOCUMENTS

| | | |
|---|---|---|
| JP | 2015-194544 A | 11/2015 |
| WO | WO 2015/179452 A1 | 11/2015 |
| WO | WO 2016/012391 A1 | 1/2016 |
| WO | WO 2016/063322 A1 | 4/2016 |
| WO | WO 2016/090331 A1 | 6/2016 |

OTHER PUBLICATIONS

Tanaka, Kenichiro, et al., "Descattering of Transmissive Observation using Parallel High-Frequency Illumination," *IEEE International Conference on Computational Photography (ICCP)*. 8 pages (Apr. 19, 2013).

Solomon, Chris, "The top-hat transformation," *Fundamentals of Digital Image Processing: A Practical Approach with Examples in MATLAB. John Wiley & Sons*, pp. 230-233 (Jul. 5, 2011).

Sun, Jiasong, et al., "Efficient positional misalignment correction method for Fourier ptychographic microscopy," Biomedical Optics Express. vol. 7, No. 4, pp. 1336-1350 (Apr. 1, 2016).

Cruz-Roa, Angel Alfonso, et al., "A Deep Learning Architecture for Image Representation, Visual Interpretability and Automated Basal-Cell Carcinoma Cancer Detection," *MICCA 2013. Part II. LNCS 8150*, pp. 403-410.

D' Ambrosio, Michael V., et al., "Point-of-care quantification of bloodborne filarial parasites with a mobile phone microscope," *Science Translation Medicine*, vol. 7, Issue 286, 10 pages (May 6, 2015).

Kappeler, Armin, "Deep Neural Networks with Applications in Image and Video Classification and Recovery," *Ph.D Thesis*, Northwestern University (Oct. 4, 2016).

* cited by examiner

METHOD FOR GENERATING AND ANALYZING AN OVERVIEW CONTRAST IMAGE

FIELD OF THE INVENTION

The invention relates to a method for producing and analyzing an overview contrast image of a sample carrier and/or of samples arranged on a sample carrier.

BACKGROUND OF THE INVENTION

Traditional light microscopes have been developed on the assumption that a user can look through an eyepiece onto a sample carrier while sitting or standing and interact directly with the sample in the sense that he will quickly be able to obtain an overview of the sample and of the field of view of the objective and laterally move the sample carrier with the sample either directly or using an adjustable sample stage so as to bring other regions of a sample into the field of view of the objective. The user of the microscope can remain at his location and need only minimally move his head, which means that in this respect, traditional microscopes are highly ergonomic.

Examination methods in particular for biological samples have been developed further over time, and as a consequence, the construction of microscopes that are suitable for performing said examination methods have also become ever more complex. In today's microscope systems, which permit the recording of image stacks along the observation direction and the reconstruction of a spatial image of the sample therefrom, images are produced with the aid of detectors. Detectors that are used are, for example, cameras that are configured with corresponding surface sensors, or photomultipliers. Consequently, the working space in such systems has shifted from the microscope stand and consequently from the sample to the computer or screen of such a computer. And yet, the working space in front of the stand is likewise used and required to prepare, i.e. set up, the sample for the examination. To this end, the sample on the sample carrier must be moved into the field of view of the objective, a sample region must be chosen, an adjustment to the position of said sample region must be performed, and, finally, the sample must be brought into focus. The workflow when using modern, complex microscope systems is therefore associated with two working spaces that represent different steps in the workflow and are spatially separate from one another—first, the microscope stand with the eyepiece for direct observation, and then the screen of a connected computer.

By attaching further instruments such as incubators for examining living cells, the direct view onto the sample, that is to say the position of the objective field of view in the sample, is greatly limited. If moreover larger sample carriers—for example multiwell plates—are used so that a multiplicity of samples can be examined in succession, the orientation on the sample is likewise obstructed.

As a result, finding the sample and setting the sample region are made more difficult for a user, and in addition, there is an orientation loss on the sample. Changing repeatedly between the computer working space and the microscope stand at which the sample can be directly observed is necessary for setting purposes.

In addition, microscope systems that are geared at the throughput of a high number of samples and are not continuously controlled also exist. In this case, sample regions must be automatically detected and microscopically captured. The sample carriers here typically carry an inscription, for example in the form of a barcode or a QR code, that must be assigned to the samples. Such examinations proceed semi-automatically; for example, a user only intervenes to change the sample carriers, to set an overview image, or to register the sample carrier number.

Especially when using multiwell plates in microscope systems with a high throughput, some of the wells may contain no samples or may contain incorrectly embedded, contaminated or defective samples. Said wells are likewise examined in the semi-automatic method, even though the results cannot be used, which means that the process takes more time than is actually necessary.

Although different methods exist in the prior art for producing overview images, these have more or less significant drawbacks. For example, an image can be recorded with the microscope optical unit and a weakly magnifying objective and a camera that is arranged downstream of the objective. However, this allows the recording of merely a small object field as compared to the size of the sample or of the sample carrier, in particular if sample carriers for a plurality of samples are used. In order to be able to record large sample regions, such as for example for multiwell sample carriers, it is therefore necessary to record a plurality of images of sections of the sample or of the sample carrier that are located next to one another and to subsequently combine them. This procedure is quite lengthy and not suitable for example for examining living samples.

An overview image can also be recorded if, instead of the microscope optical unit, a camera with a camera objective lens with which a relatively large object field can be imaged is used; the camera objective lens is generally not telecentric. This solution is implemented for example in the AxioScan series by the applicant, but can be used only with bright field illumination and incident light. Coverslips and undyed samples can be detected only with difficulty in this method.

Different solutions illuminate samples and sample carriers obliquely, i.e. at an angle that differs from zero relative to the optical axis, wherein the back-scattered light is detected. The sensitivity of the measurement over the object field to be measured here greatly fluctuates, which means that the results are not always reliable.

DESCRIPTION OF THE INVENTION

It is therefore an object of the invention to produce an overview image of a sample carrier in which the structure of the sample carrier itself and possibly further structures, for example of the inscription on the sample carrier, of possible sample regions, of any immersion liquid that may be present, of the actual sample and/or of sample errors such as air bubbles, dirt etc., can be detected clearly and without errors. Compared to normal recordings of a camera and even HDR images, the overview image is intended to have increased contrast or an improved signal-to-noise ratio of the particular structures of interest, which is why the overview image will be referred to as an overview contrast image below. The overview contrast image can be made available to the user for the purposes of navigation, or it can be used to improve the automated analysis of samples and to reduce the susceptibility to errors, for example by detecting sample errors.

This object is achieved by a method of the type described in the introductory part, in which the overview contrast image is produced as follows: A sample carrier—generally carrying at least one sample—is arranged at least partially in the focus of a detection optical unit and is illuminated in transmitted light with a two-dimensional, preferably array-type, illumination pattern. At least partially here means that the sample carrier or the sample does not need to be completely visible, but means in particular that the sample carrier and/or the samples can also have an extent along the optical axis that is greater than the depth of field of the detection optical unit used. A detection optical unit that can be used can be the optical unit of a microscope, although it is preferably a camera having a camera objective lens, which makes it possible to image a large object field onto a surface detector, preferably with a sufficiently high depth of field.

In this refinement of the method, it is necessary for producing the overview contrast image to detect at least two overview raw images with different illuminations of the sample carrier.

The overview raw images, that is to say unprocessed images, are then detected for example by the camera by way of a surface detector—for example a CMOS chip—registering the intensity pixel by pixel. Depending on the type of illumination, the overview raw images can be recorded successively or simultaneously, for example using a single camera.

A calculation algorithm that is used to calculate an overview contrast image from the at least two overview raw images is chosen in dependence on the type of the illumination and information that is to be extracted from the overview contrast image. The information can be, for example, the already mentioned structures of the sample carrier, of the sample etc., and of the inscription on the sample carrier.

Likewise in dependence on the information that is to be extracted from the overview contrast image, an image evaluation calculation algorithm is chosen that is used to extract the information from the overview contrast image. Said information can then be used for example by the user on the screen of a connected computer to initiate further steps as part of the observation and analysis, for example to navigate on the sample, which is accomplished by the image being represented on a screen and the user choosing the sample region of interest for example by way of a mouse click. On account of the image evaluation, the microscope system can then be automatically adjusted to that position. However, the information can also be used as part of an automated examination, for example in high-throughput examinations, to exclude incorrectly filled wells of a multiwell carrier, such as a microtiter plate, with the result that the microscope is not even adjusted to their positions.

Essential aspects relate to the use of a two-dimensional, in particular array-type illumination and to the recording of the overview raw images with different illuminations. Two-dimensional illumination can be obtained in different ways, wherein preferably an array of illumination elements of the same size is used to produce illumination patterns. At any rate, the individual illumination elements must be distinguishable from one another in the at least two overview raw images, that is to say they must be able to be represented separately from one another in the image, even though they were not arranged at the focus. The illumination elements can be LEDs, OLEDs, the ends of optical fibers, elements of an illuminated DMD (digital micromirror device) or of a different spatial light modulator. They can be elements that actively or passively emit light. The illumination elements can also be produced for example with a light source that emits light over a surface and upstream of which for example a switchable filter structure is arranged, with which one or more properties of the illumination elements—for example color, intensity or polarization—can be manipulated. With particular advantage, however, light-emitting diodes (LEDs) can be used, because these can be arranged in nested arrays of multicolor LEDs and also provide a sufficiently high light output, and moreover, microscopes that use an LED array, that is to say LEDs arranged in the manner of a matrix or a grid (LED array microscopes, angular illumination microscopes—AIM), for illumination are already available. The LED arrays of such microscopes can be likewise used to produce two-dimensional illumination patterns.

The different illuminations with which the at least two overview raw images are recorded can be realized in different ways. One simple possibility is to use a static two-dimensional illumination pattern and to move the sample carrier laterally, that is to say perpendicularly to the optical axis of the detection optical unit, relative to the illumination pattern between two recordings. This can be accomplished either by moving the illumination pattern itself—likewise arranged in a plane with the optical axis as a normal—or by moving the sample carrier. The sample carrier or the sample is here illuminated in transmitted light, that is to say the sample carrier is located between the illumination elements of the illumination pattern and the detection optical unit, for example the camera.

In addition to spatially different illuminations, it is also possible to use illuminations that differ in terms of time, for example by recording a plurality of overview raw images with different exposure times or with illumination of differing lengths with the same exposure time, with the signal-to-noise ratio being less favorable in the latter case. Using the HDR (high dynamic range) method known in the prior art, an overview contrast image can be calculated from said overview raw images.

Another possibility is to produce spatially different illuminations using different illumination patterns, wherein the illumination patterns are preferably chosen in dependence on the information that is to be extracted. In principle, a multiplicity of illumination patterns that can be impressed on the array of illumination elements, for example, are suitable. For example, different illumination patterns can be produced by driving the illumination elements individually or in groups and switching them to produce different illumination patterns, wherein a first portion of the illumination elements is switched to emit light and at least a second portion of the illumination elements is switched to emit no light or to emit light of a different color or light of a different polarization. If the at least second portion of the illumination elements does not emit light, each pattern includes exactly two parts, and the overview raw images are detected successively. If the second portion of the illumination elements emits lights of a different color, the illumination elements can also be divided into more than two groups and comprise a third or further parts that emit light of respectively different colors, wherein the colors differ from one another in pairs. A corresponding statement applies to the polarizations. Upon illumination with light of different colors, the overview raw images can be recorded simultaneously, provided that, on the detection side, separation into the different color channels is effected. For example, if the array of illumination elements comprises LEDs in the three RGB primary colors red (R), green (G) and blue (B), and if the sensor of the camera has corresponding sensors assigned to said color channels, a separation is readily possible, and three overview raw images can be recorded at the same time. Similar is true for polarized illumination, for example if an LED array is provided with polarization filters of different polarizations and the polarization directions are likewise detected and used for separating the channels.

If the illumination elements are in the form of LEDs, and an LED is formed from three individual mutually adjacent sub-LEDs that each emit light in different primary colors red, green and blue, the different illuminations can also be set by illumination from different angles in the primary colors. Here, too, the overview raw images can be detected simultaneously.

Another possibility is to produce explicitly different illumination patterns and to record the overview raw images successively with different illumination patterns. This can be done in a first variant for example by stochastically choosing the first portion of the illumination elements for each illumination pattern, wherein the individual illumination elements can randomly be driven and switched to emit light or to emit no light, wherein care should be taken to ensure by way of boundary conditions the best possible equal distribution of illumination elements that emit light and those that do not emit light. In a second variant, pulse-width-modulated illumination elements are used—this can be realized particularly well with LEDs or OLEDs—wherein the pulse width is selected to be longer than the integration time of a detector unit for recording the overview raw images. In this case, the illumination elements do not need to be driven individually.

Instead of stochastic illumination patterns, it is also possible to produce illumination patterns in which the illumination elements exhibit a regular distribution. For example, chessboard-type, cross-shaped or half pupil distributions can be used for the light-emitting illumination elements. In particular in the case of chessboard-type distribution, there are two good possibilities: First, the second portion of the illumination elements may emit no light, in which case two overview raw images are recorded successively with mutually complementary illumination patterns. If the illumination is in the manner of a chessboard, the patterns are inverted with respect to one another. Second, the two parts of the illumination elements can also emit light of different colors or polarizations, in which case the overview raw images can be recorded simultaneously in one image and subsequently be separated into color channels or polarizations. In the case of a chessboard-type illumination with two illumination patterns, the two patterns are not only complementary, but also inverted with respect to one another. If a plurality of patterns—for example a single light-emitting illumination element that scans the array—are used, all patterns together behave in a mutually complementary fashion, that is to say, overall, they produce an array of only light-emitting illumination elements. In the case of half pupil illumination, in each case two out of the four necessary illumination patterns are mutually complementary.

Finally, it is also possible to realize different illuminations by selecting from the array of illumination elements at least one section and producing the illumination pattern only in said section. The different illuminations are achieved by a scanning movement of the at least one section on the array, wherein the illumination elements outside of the at least one section are switched to emit no light. For example, illumination with an individual LED can be used here, or a section of a chessboard-type illumination. If a sample carrier is large, it is possible here to choose a plurality of sections that are moved in parallel fashion; a combination with differently colored illumination elements is likewise possible to produce a plurality of sections at the same time.

After the overview raw images have been recorded, a calculation algorithm that is used to calculate the overview contrast image from the at least two overview raw images is chosen in dependence on the information that is to be extracted from the overview contrast image. The choice of the calculation algorithm is preferably also made in dependence on the previous choice of the illumination method, i.e. is adapted thereto. The overview contrast image is preferably produced either in dark-field mode or in bright-field mode, because these permit the best contrast, but mixed modes are also possible. It is necessary here to ensure that the contrast is optimum for the structures of interest, for example depending on whether the cover slips, the sample itself, or the inscription is/are to be represented with the highest possible contrast. Under certain circumstances, overview contrast images can be produced from the overview raw images both in bright-field and in dark-field mode, depending on the desired information. In addition to the production of an overview contrast image in a dark-field or bright-field mode, other types of contrast can also be produced, for example overview contrast images in a HDR mode, which contain dark-field and bright-field components.

In a first configuration, the calculation algorithm is based on a pixel-wise projection, preferably a ranking projection or a projection of statistical moments. For producing the overview contrast image from a stack of at least two overview raw images, the overview raw images are compared pixel by pixel, and the intensity value of one of the pixels for the corresponding position in the overview contrast image is chosen in accordance with a projection condition. The recorded image stack is consequently subjected to calculation pixel by pixel, that is to say each pixel in the overview contrast image is influenced only by the pixels in the image stack that are located at the same image position in the overview raw images. In the case of a ranking projection, the corresponding pixel values of the overview raw images for an image position are sorted by intensities, and the value corresponding to the p-quantile is used for the overview contrast image, with p being a parameter that is to be specified by the user or is specified by the calculation method. A special case is the minimum projection with $p=0.0$, in which the pixel with minimum intensity is chosen; other special cases are the maximum projection with $p=1$, in which the pixel with maximum intensity is chosen, or the median projection with $p=0.5$.

Depending on the illuminations with which the overview raw images were produced, overview contrast images can be produced in dark-field contrast or in bright-field contrast with this type of calculation. An overview contrast image in bright-field mode can be produced for example if the illumination elements—in particular if these are in the form of LEDs—are not overdriven and $p=1$, i.e. the maximum projection is chosen. However, the overview contrast image can be also produced in dark-field mode, for example if the brightest possible overview contrast image is produced with the greatest possible p, wherein only pixels that have not been directly illuminated by an illumination element will be taken into account in the calculation. For example, if two overview raw images are produced with a chessboard-type distribution of the first portion of the illumination elements and a distribution that is complementary thereto, $p=0$ is selected and a minimum projection is performed. If, by contrast, the illumination pattern is produced only in a section of the array and this section is moved in a scanning fashion on the array, each pixel in the image is directly illuminated less often than overview raw images are recorded. For example, if four LEDs that are switched on in the form of a cross are used and 30 overview raw images are produced for a scanning chessboard pattern, each pixel is illuminated directly at most four times by an LED having a significantly larger diameter than a pixel. The value is then p=((30−1)−4)/(30−1)=0.8621.

Alternatively, it is also possible to use an algorithm based on the projection of statistical moments. In this case, each pixel in the overview contrast image corresponds to a statistical moment, such as for example the standard deviation of the intensity over the corresponding pixels of the overview raw images. In particular in combination with a sequence of statistical LED patterns that are moved laterally relative to the sample carrier, this offers good contrasts and maintains even small details, with the result that this calculation algorithm is particularly suitable for example for detecting multiwell sample carriers or chamber-slide sample carriers.

The advantages of the above-described projection methods as calculation algorithms are that they are able to be parallelized very well and consequently permit very fast calculation, and, in addition, owing to the equal treatment of all pixels, no seam artefacts occur, as would be the case for example with calculation algorithms based on segmentation, in which, in unfavorable cases, the boundaries of the structures seem to discontinuously jump at the seams.

In another configuration, the calculation algorithm is based on morphological operations with subsequent pixel-wise projection, preferably on a top-hat or black-hat transform with subsequent pixel-wise maximum projection. It is possible using the top-hat transform to highlight bright structures on a dark background, and the black-hat transform can be used to highlight dark structures on a bright background. These calculation algorithms can be used to make in particular glass edges, that is to say edges of sample carriers or cover slips, visible. Next, a pixel-wise maximum projection over the overview raw images thus transformed is formed and the overview contrast image is produced in this way. The advantages of this calculation algorithm are that the information is acquired at the same time from bright-field and dark-field contrasts, and that it is likewise efficiently subjected to a calculation. However, as compared to a ranking projection, the contrast in the images that have been subjected to calculation is mostly lower and is frequently visible only in the case of glass edges. In addition, strong background artefacts can be produced that must then be redressed.

In a further configuration, a calculation algorithm based on segmentation is chosen, in which initially a determination is made for each pixel of an overview raw image as to whether said pixel has been directly irradiated with light by an illumination element. These pixels are then not taken into account for the production of an overview contrast image in the dark-field contrast mode. The overview contrast image is produced using a projection method in this case, too. The advantage of this calculation algorithm as compared to the ranking projection is that an explicit determination is made here as to which pixel information from the overview raw images can be used. A disadvantage is that, on account of the segmentation and the resulting unequal treatment of pixels, seams can form in the calculated contrast image. In addition, the calculation cannot be performed as efficiently as in the previously described calculation algorithms.

In one alternative configuration of the method operating in bright-field mode, the overview contrast image is not produced by calculation but is detected directly, that is to say no overview raw images are detected, or, in other words, the overview raw image in this case is identical to the overview contrast image. To this end, a diffusion screen is inserted into the beam path between the array-type illumination pattern—which can be made up of an array of illumination elements of preferably equal size in this case, too—and the sample carrier. The diffusion screen, which produces diffuse illumination, which is advantageous for bright-field illumination, can also permanently remain in the beam path, provided it is switchable, and it is then switched on, i.e. switched to diffusion, only for the production of an overview contrast image in bright-field mode.

If the sample carrier is laterally moved relative to the illumination pattern between two recordings, it is necessary to know for the calculation how the sample or the illumination pattern in that case moves in the image. To this end, the camera is calibrated relative to the sample carrier or the illumination pattern in order to be able to map—in the case of a movement of the sample carrier—the coordinates of a stage, on which the sample carrier is held and which can be displaced to move the sample carrier, onto image coordinates. A similar procedure can be used for movable illumination patterns. In the case of a displaceable stage, a calibration pattern, for example a chessboard, is placed in the stage concretely for calibration purposes, as a result of which the coordinate mapping can be estimated with sufficient accuracy. Alternatively, such calibration can also be dispensed with in the calculation and the movement of the sample can be ascertained by way of image analysis or using a different measurement system.

In particular if the illumination pattern is stationary and the sample carrier is moved between the recordings, an overview contrast image can be generated after calibration, that is to say after a quantification of the actual movement of the sample carrier in relation to the image, even for larger sample carriers that do not entirely fit into the object field that is capturable by the camera or the detection optical unit, by initially producing individual contrast images that each show different regions of the sample carrier—and/or of the sample—and are produced from corresponding individual overview raw images. Said individual contrast images are subsequently combined to form the overview contrast image, wherein the calibration is used to correctly locate connecting points for joining them.

Notwithstanding the above, a calibration is also advantageously performed using the recording and evaluation of a calibration pattern for correcting geometric distortions before the recording of overview raw images. The calibration pattern is an object of known geometry and clearly detectable structure—for example the aforementioned chessboard pattern—which is placed at different positions in the image field of the camera and is recorded with the camera. However, it is also possible to use the array of illumination elements, in particular if these are in the form of LEDs, as a calibration pattern. Such calibrations are known from the prior art.

As has already been indicated in connection with calculation algorithms based on segmentation, background artefacts may occur in the produced overview contrast image depending on the calculation algorithm used. Such disturbing background signals are removed, i.e. by calculation, preferably after the production of the overview contrast image yet before the evaluation thereof using corresponding correction algorithms. If there is no lateral movement of the illumination pattern or the sample carrier, the artefacts typically form a periodic structure that follows the positions of the individual illumination elements. These can then be removed using what is known as self-filtering. Additional correction methods are known in the prior art that can be used to remove the occurring background artefacts or at least to reduce them, in particular by recording or calculating a background image, which is then subtracted from the overview contrast image, i.e. removed therefrom by calculation. For example, a background image can be determined from the calculation of the overview raw images by averaging out the foreground. A background image can also be determined from a recording without the sample carrier or with an empty sample carrier. By subjecting the background contrast image to a calculation, a background image can be determined for example by calculating the average pixel values in local regions around an illumination element that does not emit light by way of analyzing all illumination elements in the overview contrast image. This is because the foreground structure is independent of the position relative to the illumination element and is averaged out, but the background structure is dependent on said position and is consequently intensified. This produces a background image via the position of the illumination elements that can subsequently be calculated out of the overview contrast image. Another possibility for calculating out background artefacts is the use of a bandpass filter, possibly also in combination with non-linear filters.

In a final step, the background contrast images are finally automatically analyzed using an image processing algorithm that is to be chosen and the required information is extracted. The information that is to be extracted comprises one or more of the following data: type of the sample carrier, inscription in the sample carrier, locations of samples or sample regions, cover slips, wells of a multiwell plate in the image, information relating to an immersion liquid such as position, volume, shape, positions of artefacts, defective samples, air bubbles etc. This information can be reliably extracted only on account of the high contrast in the overview contrast images.

An image processing algorithm that can be chosen is for example an algorithm based on the principle of machine learning, in particular a deep learning algorithm, which is preferably trained on the basis of overview contrast images with known information.

For automated extraction of the aforementioned information from the overview contrast images, it is expedient to use methods from the field of machine learning. In this case, an annotated training sample comprising a quantity of contrast images that are to be analyzed is provided for the respective task, including for example image classification, segmentation, localization, detection. Each contrast image is here assigned a desirable output corresponding to the task, as will also be explained below with reference to examples. Using techniques of machine learning, it is then possible for a model to be automatically adapted in a learning step such that the desirable and correct outputs are produced even for non-viewed, i.e. new images.

Possible algorithms based on techniques of machine learning will be outlined by way of example below. Alternatively, methods from traditional image and signal processing can be used, but algorithms based on machine learning, and in particular based on deep learning, offer significant advantages for example in terms of quality, robustness, flexibility, generalizability, and development and maintenance complexity.

A deep learning algorithm based on a convolutional neural network can be advantageously used to identify the type of a sample carrier, for example whether it is for example a multiwell sample carrier, a Petri dish, a chamber slide etc. The task is thus one from the field of image classification, and the algorithm uses an image as input and outputs a class. The training sample in this case comprises contrast images, and each contrast image is assigned one of the suitable sample carrier types, a first contrast image is assigned the type "Petri dish," a second contrast image is assigned the type "multiwell plate," a third contrast image is assigned the type "chamber slide," a fourth contrast image is assigned the type "slide," and so on.

A convolutional neural network (CNN) consists of different layers, for example convolutional layers, pooling layers, non-linear layers, etc., the arrangement of which is specified in the network architecture. The architecture used for the image classification follows a certain basic structure, but is in principle flexible. Each element of the network receives an input and calculates an output. In addition, some elements of the network have free parameters that determine the calculation of the output from the input. A three-dimensional number array, i.e. a color image having in each case three color values per pixel, is input to the first layer as an input of the network. The last layer then outputs a probability distribution over all possible sample carrier types as the output of the network—for example the output for an overview contrast image is thus: "slide" 87%, "multiwell plate" 1%, "Petri dish" 2%, "chamber slide" 10%. Optionally, a rejection class—which provides for example the values "unknown"/"invalid"/"empty"—can also be integrated. On account of the training process, the free parameters of the network are adapted on the basis of the provided training data such that the outputs of the model match the expected outputs as closely as possible.

The training can also use a model that has already been trained for other data as a starting point in the sense of a fine adjustment, which offers advantages in terms of quality, time requirements, and data expenditure.

As an alternative to CNNs or methods derived therefrom or related methods of deep learning, the image classification can also be performed using traditional methods of machine learning, which typically comprise two steps: (I) feature extraction, and (ii) classification. In the case of the feature extraction of step (i), the overview contrast image is transformed, using a predefined algorithm, into an alternative representation—typically into a compact or sparse vector. Simple examples here are for example local gradient histograms (histograms of oriented gradients, HoG). In the classification of step (ii), each of these feature vectors is then assigned a class using a classifier. One example of a classifier is a support vector machine (SVM). The free parameters of the classifier are here likewise adapted in the training step such that the actual outputs match the desirable outputs as closely as possible.

A hybrid approach between traditional machine learning and deep learning is based on the use of a CNN for the feature extraction in step (i). In this case, a CNN that has been trained for different data is cut off at a specific layer, and the activation of the network is used as a feature vector.

The localization of structures of the sample carrier, for example cover slips in the case of slides and Petri dishes or chambers of chamber slides or multiwell plates, on the one hand, and of structures of the sample or sample regions on the other can be considered a problem of semantic segmentation, that is to say, for an overview contrast image as the input image, an image in which each pixel of the input image is assigned a class (e.g. "background," "cover slip," "dirt," "sample," . . . ) is to be returned. This can preferably likewise be implemented with networks from the field deep learning, for example using fully convolutional networks (FCNs) that are based on CNNs.

Like CNNs, FCNs typically expect as an input a three-dimensional number array, i.e. a colored overview contrast image, but output an array in which each pixel of the input image is assigned a probability relating to it being part of each of the occurring classes. The training sample in this case comprises contrast images, and each contrast image is assigned an array (graylevel image) of the same size, in which each pixel is in turn assigned a class—coded via a gray level. Training proceeds similar to in the case of CNNs. It is possible here to use different FCNs for the localization of sample carriers and for the localization of sample regions, but the evaluation is in particular possible using a single FCN, which images or contains for example both "coverslip" and "sample" as classes.

It goes without saying that the aforementioned features and those yet to be explained below can be used not only in the combinations specified but also in other combinations or on their own, without departing from the scope of the present invention.

BRIEF DESCRIPTION OF THE DRAWINGS

The invention is explained in even greater detail below for example with reference to the accompanying drawings, which also disclose features essential to the invention. In the figures.

DETAILED DESCRIPTION OF THE DRAWINGS

Figure 1:
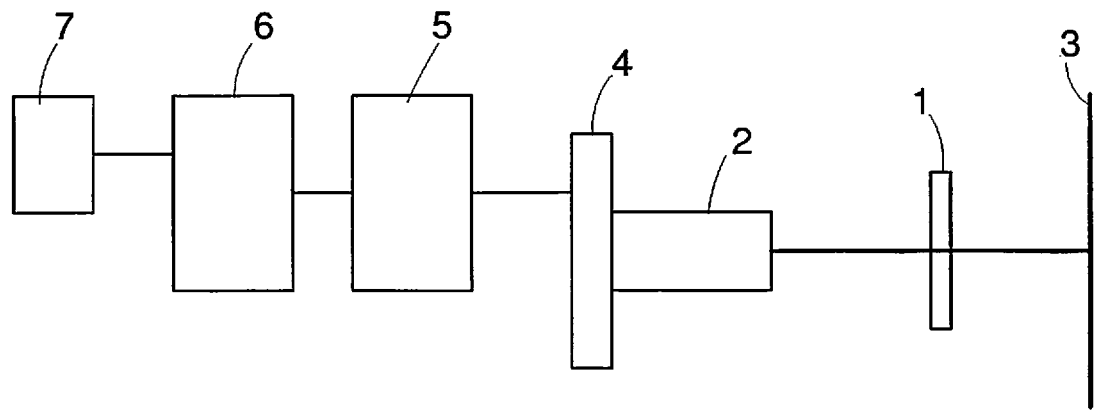
FIG. 1 shows an arrangement for performing a method for producing and analyzing an overview contrast image.

To begin with, FIG. 1 outlines an arrangement with which an overview contrast image of a sample carrier 1 and/or samples arranged on the sample carrier 1 can be produced. The sample carrier 1 is here arranged at least partially in the focus of a detection optical unit 2 and is illuminated in transmitted light with a two-dimensional, array-type illumination pattern 3. In order to produce the overview contrast image, at least two overview raw images are initially detected with different illuminations of the sample carrier 1. To this end, by way of example a surface detector 4 is used here, onto which the detection optical unit 2 images. The detection optical unit 2 can be a microscope objective having a small magnification, although it is preferably the objective lens of a camera, which is able to image a larger region of an object field, which then ideally covers the entire sample carrier 1 in an overview. Accordingly, the surface detector 4 in this case is the sensor of the camera, for example a CMOS chip. Depending on the configuration and in particular in dependence on the selection of the illumination, the surface detector 4 registers only the intensities—for example in the case of white illumination—or the intensities are separated into different color channels, for example red (R), green (G) and blue (B). Similar to different colors, it is also possible to take into account different polarizations in the illumination using appropriate sensors that also register the polarization and to use said polarizations for separation into different channels.

Depending on the type of the pattern and on the type of the illumination, the overview raw images are recorded either at the same time or in succession, wherein for each pixel the corresponding intensity values are registered. The overview raw images are then supplied to a calculation unit 5 for subjecting them to a calculation to obtain an overview contrast image. In the calculation unit 5, a calculation algorithm that is used to calculate an overview contrast image from the at least two overview raw images is chosen in dependence on information that is to be extracted from the overview contrast image, and optionally also in dependence on the illumination. The overview contrast image is then supplied to an image evaluation unit 6, in which an image evaluation algorithm that is used to finally extract the information is selected in dependence on the information that is to be extracted from the overview contrast image. The information is transmitted to a control unit 7, which correspondingly processes it further and excludes from the microscopic analysis, for example in a high throughput method, such multiwells in which the evaluation of the overview contrast image has indicated that said multi-wells have not been correctly filled, for example contain defective samples or air bubbles, etc. The overview contrast image can of course also be represented to a user on a screen, which is connected to the image evaluation unit 6 or the control unit 7 and can be part of said units, with the result that a user can manually perform corresponding settings. The calculation unit 5, image evaluation unit 6 and control unit 7 can together be integrated in a PC as hardware and/or software.

Figure 2:
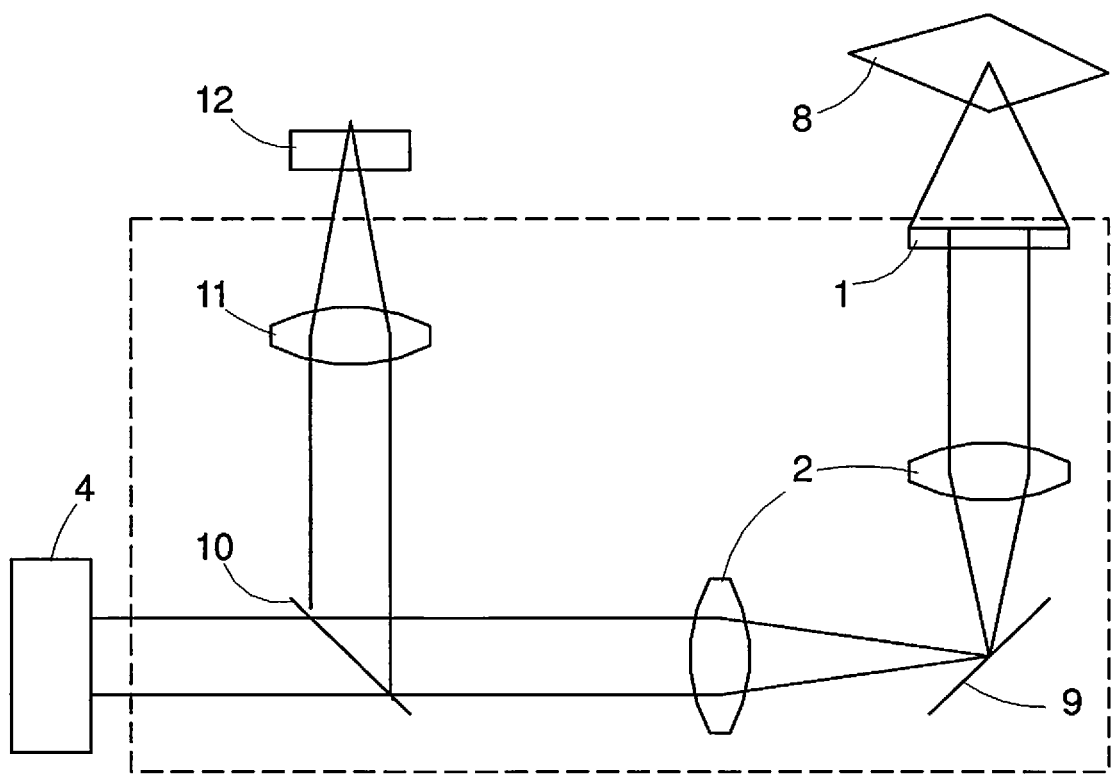
FIG. 2 shows the construction of a microscope that is suitable therefor.

As has already been indicated in connection with the description relating to FIG. 1, the method can also be readily performed with existing microscopes. Particularly suitable are microscopes that use an LED array for the illumination, in which case the illumination pattern 3 is produced by the LED of said array. Such a microscope, which uses for example angular illumination microscopy (AIM), is illustrated by way of example in FIG. 2. The sample carrier 1 is illuminated here via an LED array 8, and the detection optical unit 2 here comprises by way of example two lens elements, between which a deflection mirror 9 for folding the optical axis is arranged. A beam splitter 10 is used to guide some of the light onto a surface detector 4, while a different part of the light is directed, via a lens element 11, onto an eyepiece 12, such that the overview raw image can also be viewed by an observer. The camera and illumination can be positioned particularly well on an inverse microscope stand, for example by way of the LED array 8, with which the illumination pattern 3 is produced, being arranged above an arm, which is prepared for the transmitted-light illumination, and the camera being placed below the sample for example on the objective turret.

For producing illumination patterns 3, an array having illumination elements that preferably have the same size is preferably used. Illumination elements that can be used are for example LEDs, OLEDs, optical fibers, i.e. the ends or exit faces thereof as active light sources, or elements of an illuminated DMD (digital micromirror device) or of a different spatial light modulator as passive illumination elements. If the following text refers to LEDs for example as light sources, this is done only for illustrative purposes and does not explicitly exclude the use of the other possible arrays of illumination elements.

The overview raw images are recorded by way of a camera with the surface detector 4; the objective lens of the camera is focused, as shown in FIG. 1, at the sample carrier 1 and directed at the illumination pattern 3 or the illumination behind the sample carrier 1, which is not situated in the focus. It is possible here to use a camera having an objective lens that has a large object field and is not telecentric. No additional optical elements need to be placed between the sample carrier 1 and the illumination pattern 3, which can be configured for example as an LED array, to manipulate the illumination. Typically, the distances between the detection optical unit 2 or the surface detector 4 and the sample carrier 1 and between the sample carrier 1 and the illumination pattern 3 can in each case be selected to range between 0.5 cm and 10 cm, but they can in particular be even larger, possibly to capture the entire sample carrier 1.

In principle, the distances can also be selected freely, as long as various conditions have been met: (i) the sample carrier 1 must be located in the focal plane of the detection optical unit 2; (ii) the structures of the sample carrier 1 to be analyzed—for example edges of cover slips—can still be resolved by the camera; (iii) the structures produced by the illumination pattern 3 must be discernible on the image that is registered by the surface detector 4, i.e. individual illumination elements must be distinguishable and advantageously cover the entire structure that is to be analyzed, which can be influenced by a corresponding choice of the size of the array of illumination elements, the size of the illumination elements, and the spacing thereof, which is why for example an array of LEDs is highly suitable for larger structures such as sample carriers. If they do not completely cover the structure, a combined overview contrast image can be produced with corresponding calibration.

Figure 3:
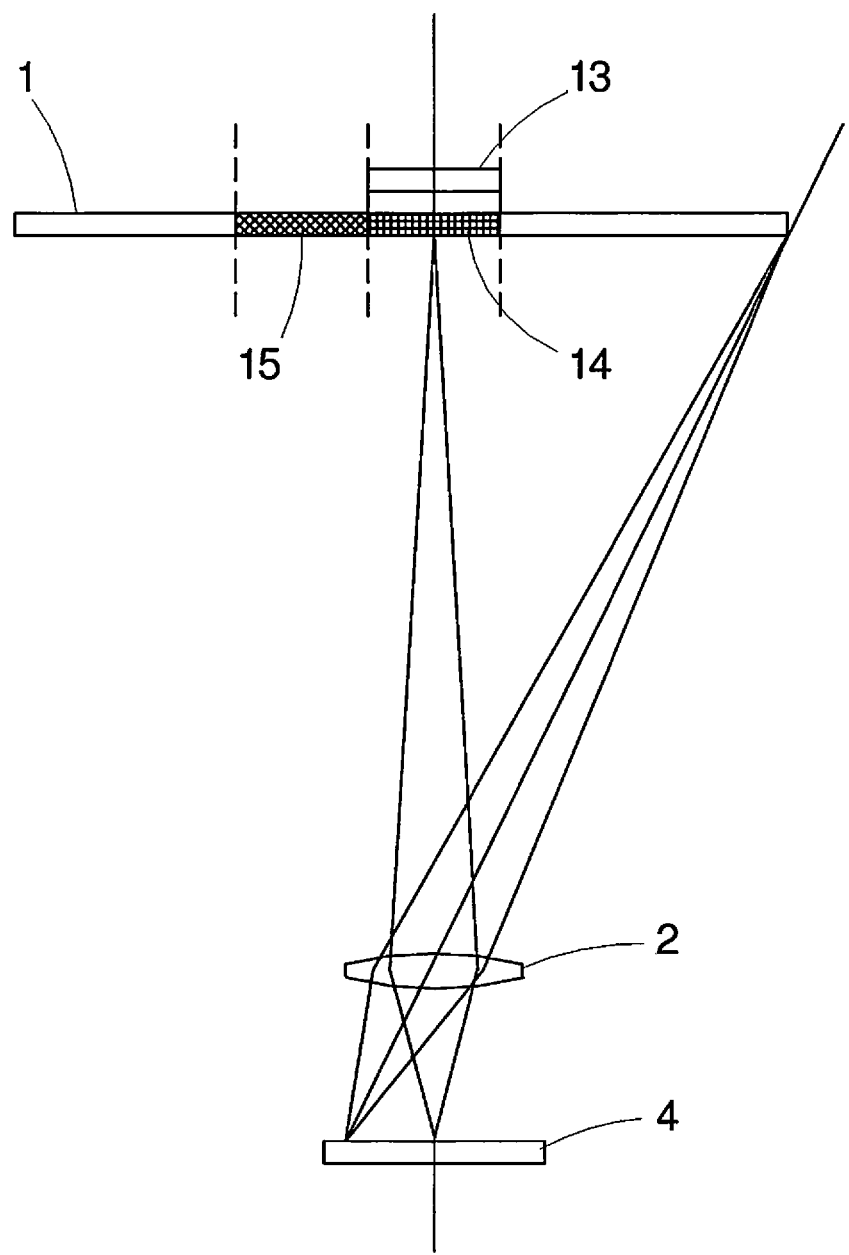
FIG. 3 shows a detail of an illumination.

The illumination will be explained in more detail below with reference to FIG. 3, in which LEDs are used as examples of illumination elements. Of the illumination pattern 3, only one LED 13, which is arranged behind the sample carrier 1, was depicted here as an example. The distances are chosen at random, and the illumination pattern 3 can in fact be arranged at an even greater distance. However, arranging it directly behind the sample carrier 1 permits arrangement in the vicinity of the focal plane, which means that the resolution of the individual illumination elements is improved.

The recording is taken with a detection optical unit 2, which is not telecentric. Each switched-on LED 13 acts either as bright-field or dark-field illumination, depending on the field region of the sample. For a first field region 14, the LED 13 is arranged directly behind the sample or the sample carrier, where a transmitted-light component dominates, such that the LED 13 acts as bright-field illumination for this first field region 14 and produces a corresponding bright-field contrast. For a second field region 15 next to the LED 13, by contrast, the LED 13 acts as dark-field illumination and can be used to produce a dark-field contrast. If the intention is to produce an overview contrast image in bright-field mode, it is possible to optionally insert a diffusion screen between the array of illumination elements and the sample carrier 1, because diffuse light sources are advantageous for bright-field contrasts, although not for dark-field contrasts. The diffusion screen can be inserted in each case, but can also be permanently positioned in the beam path, and can be switchable, with the result that light diffusion occurs only if the diffusion screen is switched on. By producing overview raw images with different illuminations, which can be realized in particular by different illumination patterns 3, the bright-field and/or dark-field information of the sample carrier 1 and also of the sample itself can be extracted and be represented in an overview contrast image.

The different illuminations are selected in dependence on the information that is to be extracted. This information generally includes the type of the sample carrier, for example whether the latter is a normal slide in the sense of a small glass plate, or a simple Petri dish, or a multiwell sample carrier having a multiplicity of open wells, or a sample carrier having different, closed sample chambers (chamber slide), which are therefore covered by a cover slip. Frequently, a sample number is indicated on the sample carrier 1, for example by way of a handwritten inscription, but more frequently as a code with a barcode or QR code, which can be interpreted in conjunction with a corresponding database. In particular when using sample carriers having a plurality of sample chamber or wells, the intention is to determine possible sample regions. In addition, the samples must be able to be identified and errors or faults, such as air bubbles, contamination or empty sample chambers, must be able to be detected. It is furthermore the intention to be able to detect the presence of immersion liquid and the form, volume, and position thereof.

Once the desired information has been automatically extracted from the overview contrast image using an algorithm for image processing, the following steps can be performed automatically or semiautomatically, depending on the task. An example to be mentioned is the choice of which well in a multiwell plate is to be examined, which can be done either automatically or only by the PC, without a user being required to once again look through the eyepiece, but in which it is likewise possible to represent an overview image of the complete sample carrier 1.

Different illuminations and calculation algorithms that are suitable herefor will be described below with reference to FIGS. 4-12. For illustrative purposes, an LED array is always used, although the use of different illumination elements, such as were mentioned above by way of example, is likewise readily possible.

A first possibility is to produce the different illuminations using different illumination patterns 3, which are chosen in dependence on the information that is to be extracted. Such illumination patterns are illustrated in FIGS. 4-9.

Figure 4:
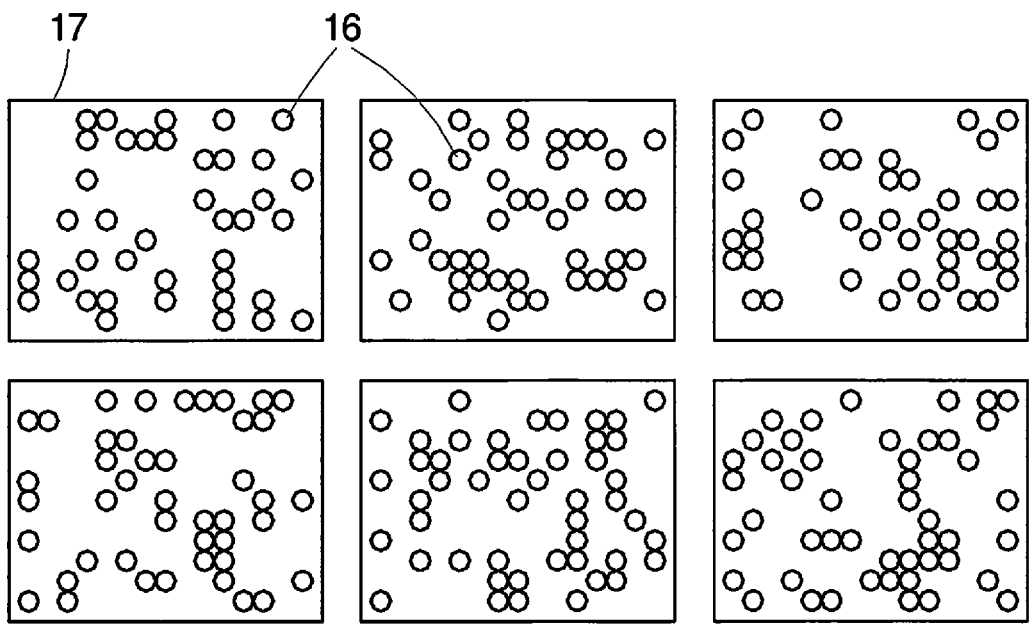
FIG. 4 shows the production of stochastic illumination patterns.

For example, different illumination patterns 3 can be produced stochastically. This is illustrated in FIG. 4, where the six frames show different illumination patterns, in which the LEDs 16 of an LED array 17 emit white light and are stochastically switched on or off. In the switched-on state, they are shown as small circles, and in the switched-off state, they have been omitted to clearly mark the different illumination patterns.

A simple possibility for producing stochastic illumination patterns 3 is to use pulse-width-modulated illumination elements having a pulse width that is selected to be longer than the integration time of a detector unit for recording the overview raw images, wherein this selection can also be made by way of specifying an integration time. During the integration time of the camera, some of the LEDs are then switched on and others are switched off, because the pulse-width modulation between the LEDs 16 is not synchronized. The LEDs 16 of the LED array 17 in this case do not need to be individually drivable or switchable.

It is of course also possible for the illumination elements to be driven and switched as different illumination patterns individually or in groups. A first portion of the illumination elements are here switched to emit light and at least one second portion of the illumination elements is switched to emit no light or to emit light of a different color or to emit light of a different polarization. In the case of the production of stochastic illumination patterns in FIG. 4, the first portion of the illumination elements is stochastically chosen for each illumination pattern 3. The second portion of the illumination elements does not emit light. In order to be able to produce a high-quality overview contrast image, relatively many overview raw images are required, with the result that generally several seconds are required to record the overview raw images. This period can be shortened if, instead of switching off the second portion of the illumination elements, it emits light of a different color, with the result that two overview raw images are recorded at the same time, which are subsequently separated by color.

Overview contrast images can be produced both in a dark-field mode and in a bright-field mode, depending on the calculation algorithm, which in this case can be based for example on a top-hat transform for a bright-field contrast image or on a black-hat transform for a dark-field contrast image, in each case with subsequent, pixel-wise maximum projection, wherein both transforms can be applied equally to the overview raw images such that it is possible to produce an overview contrast image both in bright-field mode and in dark-field mode. With this type of illumination, glass edges, that is to say the peripheries of the sample carriers 1, or cover slips can be rendered very visible, they exhibit high contrast as compared to the actual sample.

Figure 5:
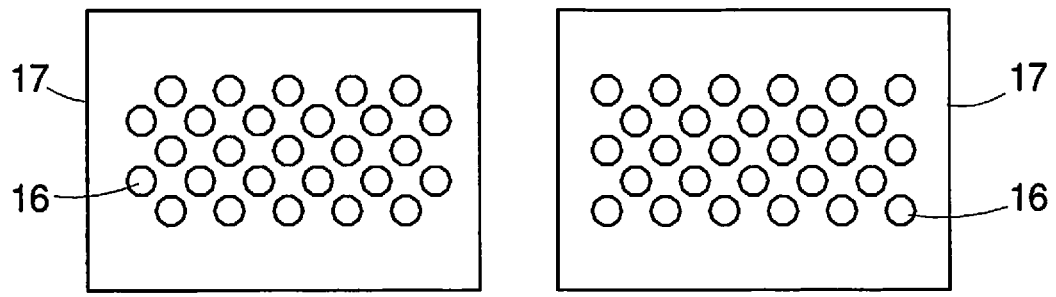
FIG. 5 shows two complementary chessboard-type illuminations.
Figure 6:
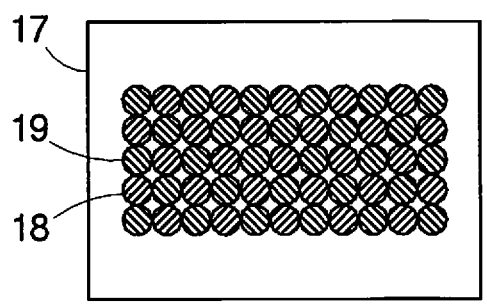
FIG. 6 shows a chessboard-type illumination with different colors.

While relatively many images—typically between 30 and 50—need to be recorded if stochastic illumination patterns are used to obtain satisfactory contrasts in the overview contrast image, other illumination patterns work with far fewer images. Such patterns are shown in FIGS. 5 and 6, which are chessboard-type patterns. Illumination elements that are switched on and off—LEDs 16—here have a chessboard-type distribution, in which case the first portion of the illumination elements which are switched on for example corresponds to the white fields of the chessboard, and the switched-off second portion of the LEDs 16 corresponds to the black fields. Two overview raw images are required, which are produced with mutually complementary, i.e. inverted illumination patterns. These two chessboard patterns are illustrated in FIG. 5. The first portion of the illumination elements is formed by the switched-on LEDs 16, and only every other LED 16 in every row and every column is switched on. In the right-hand illumination pattern of the two illumination patterns, the LEDs 16 that were switched off in the image on the left, are switched on, and vice versa. The illumination pattern can here extend over the entire LED array 17 or over only a region of interest of the sample carrier 1 to reduce the overall quantity of light and so as not to unnecessarily load the sample. The chessboard-type illumination can be used in particular for using an overview contrast image in dark-field mode; the calculation algorithm used here is in particular a ranking projection algorithm, based on pixel-wise projection, in the minimum projection. Only two overview raw images are required, and the method offers very good contrast, both for the sample carrier 1 and sample regions—for example the glass edges of cover slips and for the sample itself.

When using illumination patterns as shown in FIG. 5, LED arrays 17 with single-color LEDs can be used, which emit for example white light or light in one of the primary colors R, G, B; for the detection, a surface detector that registers multi-colored or monochromatic light can be used.

If the first portion of the illumination elements emits light and the second portion of the illumination elements does not emit light, two overview raw images that must be recorded successively are required, in the case shown in FIG. 5, to produce an overview contrast image. The overview raw images, however, can also be recorded simultaneously with a camera and subsequently separated when all portions of the illumination elements emit light of polarizations that differ from one another in pairs. To produce the chessboard-type illumination pattern, an LED array 17, which is provided with complementary polarization filters, which alternate in rows and columns, depending on the pattern, can be used here. The polarization filters can also be switchable. In this way, the two overview raw images can be produced with one recording and only need to be separated subsequently, to which end the polarization must likewise be detected.

A further possibility is that all portions of the illumination elements emit light of colors that differ from one another in pairs, that is to say, for example in the case of four portions of illumination elements, that each of the portions emits light of a different color. This is explained in FIG. 6 again on the basis of a chessboard-type illumination pattern. The first portion of the illumination elements here comprises blue LEDs 18, that is to say LEDs that emit light in the blue wavelength range, while the second portion of the illumination elements comprises red LEDs 19, that is to say LEDs emitting light in the red wavelength range. The two grids are nested within one another, with the result that a red/blue chessboard is presented on the LED array 17. The sample carrier 1 is illuminated with this illumination pattern, and a recording that already comprises both necessary overview raw images is taken. The individual overview raw images are obtained by separating the recording by color channels. Depending on the configuration of the camera, that is to say on the number of the color channels and of the LEDs 13 of the LED array 17, it is also possible for three or more patterns to be nested inside one another, with which the sample or the sample carrier 1 is illuminated at the same time. Ideally, the LEDs 16 of the LED array 17 and the color channels of the camera that is used for the recording are matched to one another; without further measures, generally the three primary color channels red, green and blue are available, because even LEDs emitting white light are made up of red, green and blue sub-LEDs.

Figure 7:
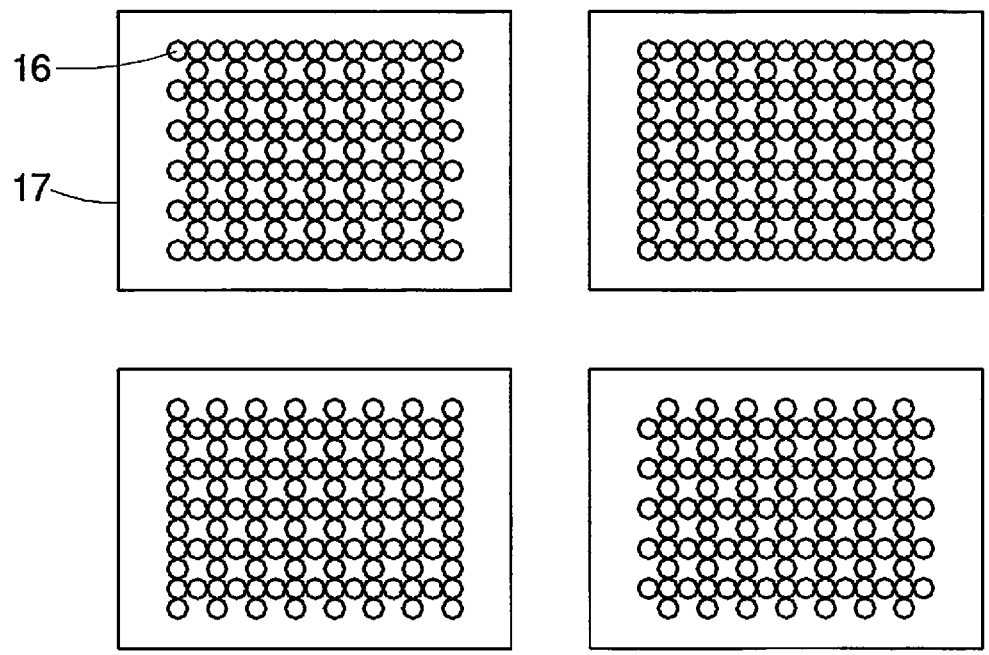
FIG. 7 shows a cross-shaped distribution of the illumination elements.
Figure 8:
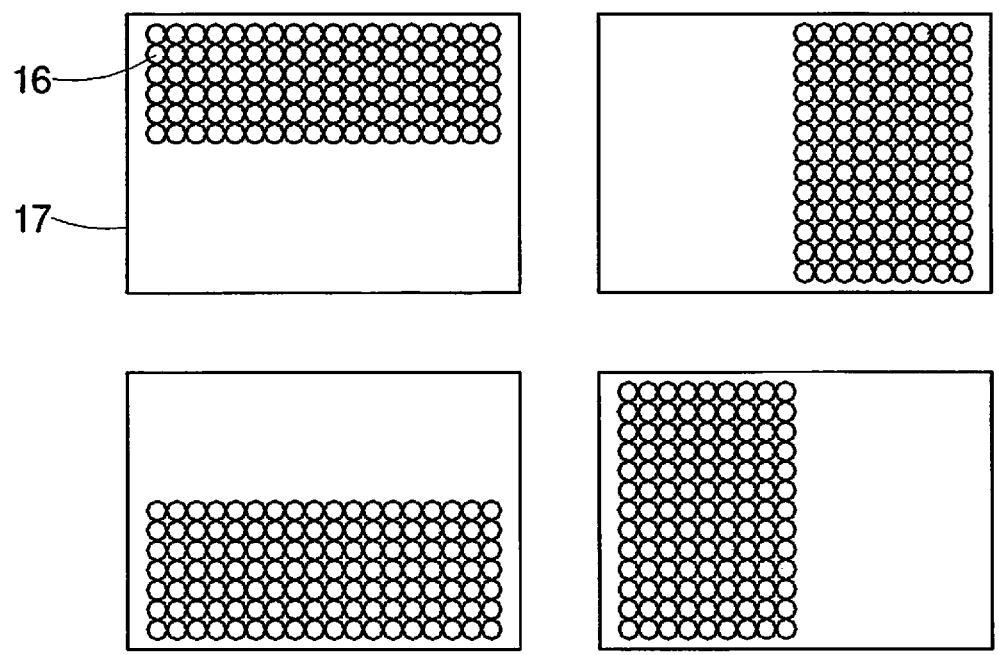
FIG. 8 shows a half pupil distribution of the illumination elements.

Instead of an illumination pattern in the form of a chessboard, different illumination patterns can also be used, in which the first portion of the illumination elements—and correspondingly the second and possibly further portions—has a regular distribution as compared to the stochastic distribution. FIG. 7 shows such an example, a cross pattern, as it is called, in which four different illumination patterns are produced and correspondingly four overview raw images are required. The contrast is here slightly greater than in chessboard-type illumination patterns. Four individual overview raw images are likewise needed when using half pupil patterns, as are shown in FIG. 8. For the production of an overview raw image, the LED array 17 is divided into two halves, in which case the first portion of the illumination elements is located in one half and the second portion of the illumination elements, which is switched-off, is located in the other half. The second overview raw image is recorded with a distribution that is complementary thereto, that is to say if first the first portion of the illumination elements fills out the left half on the LED array 17, then it will fill out the right half for the second overview raw image. Two further overview raw images are produced by dividing the LED array into an upper and a lower half, that is to say with a direction of division that is perpendicular to the first direction of division. In the case of transparent sample carriers with vertical elements, in particular in the case of what are known as chamber slides or transparent multiwell plates, it is possible in this way to achieve a high contrast. The overview contrast image is preferably produced in dark-field mode, to which end a calculation algorithm that is based on pixel-wise projection is used, preferably a ranking projection algorithm. Here, the overview raw images are compared pixel by pixel, and the intensity value of one of the pixels is selected for the corresponding position in the overview contrast image in accordance with a projection condition.

In a further configuration of the method, advantage is taken of the fact that each LED that emits white light is formed from three individual, mutually adjacent sub-LEDs, which in each case emit light in the different primary colors red, green and blue. It is possible in this case to set different illuminations—the illumination patterns can here be identical—by the illumination from different angles in the primary colors. In this case, a calculation algorithm with which an overview contrast image in the bright-field mode is produced is chosen.

Figure 9:
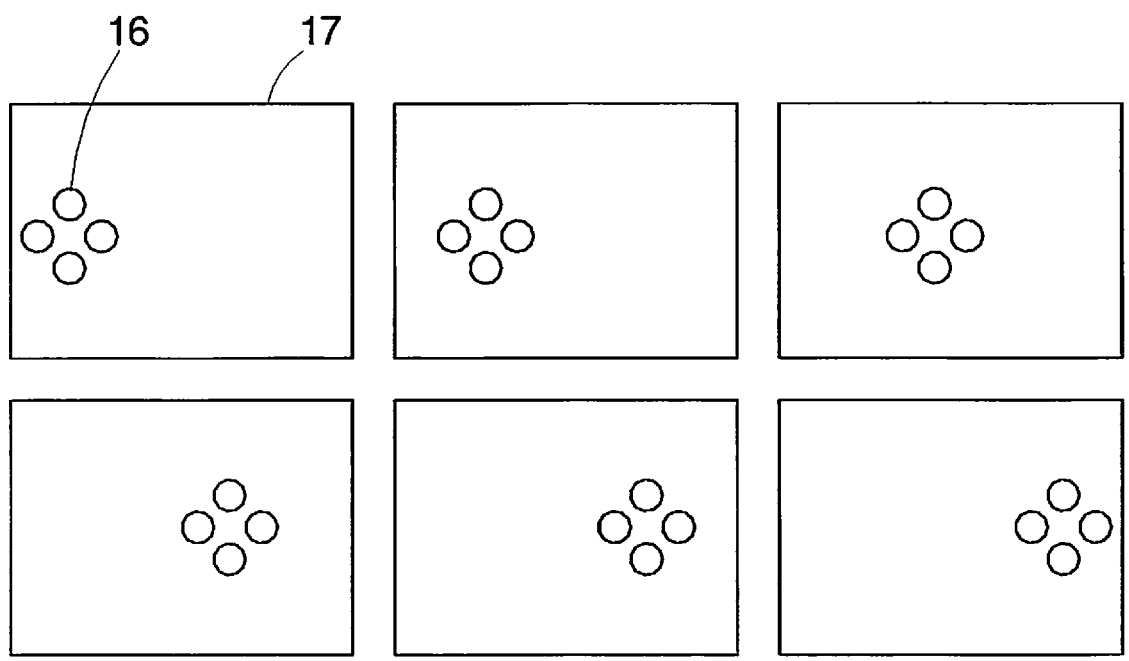
FIG. 9 shows the scanning movement of a section with an illumination pattern.

A further configuration of the method involves producing the illumination pattern 3 only in at least one section of the array of illumination elements. The different illuminations are then produced by scanning movement of the at least one section on the array. Illumination elements outside the at least one section are switched here such that they do not emit light. This is illustrated in FIG. 9 with the example of the chessboard pattern, of which a small section of four LEDs 16 was chosen here, which scans one row in a sequence of images or illumination patterns and is then moved, row by row, over the LED array 17. As compared to the chessboard pattern described in connection with FIG. 5, a greater number of overview raw images are required here, and the contrast is comparable in terms of quality. However, the quantity of light per time that is emitted by the LED array 17 is advantageously significantly lower than when using both full patterns. The background brightness is therefore reduced, and fewer disturbing reflections occur in the overview raw images. The time required for the recording of the overview raw images can be reduced by, for example, moving regions which are spatially remote in the image of the sample carrier 1 sections with illumination patterns at the same time, and/or by producing illumination patterns in different colors, which are registered separately, in the section that is to be moved.

In the section that is moved over the LED array 17, it is also possible for other patterns to be produced, for example it is possible for all LEDs except for one to be switched on, with the result that the section comprises only one— switched-off—LED, and this section is then moved. Another possibility is to switch on only one LED and to leave all the others switched-off, and to move this section over the array and in the process record the overview raw images.

A suitable calculation algorithm here is in particular a ranking projection algorithm, in particular also in the minimum projection, with the result that an overview contrast image in dark-field mode is obtained.

It may generally be necessary to overdrive the bright-field region on the camera to obtain a good dark-field signal for dark-field contrasts. For a subsequent bright-field recording, it may then be necessary to perform a further recording without an overdriven bright-field region.

Figure 10:
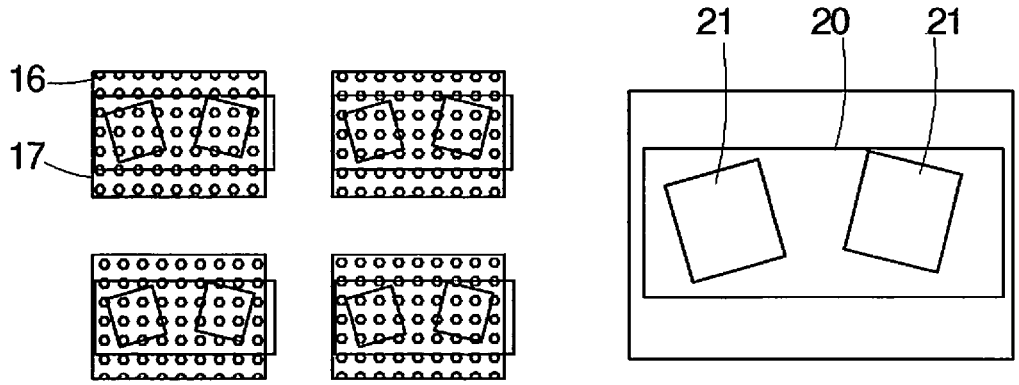
FIGS. 10-12 show the production of overview contrast images from overview raw images with static illumination patterns.
Figure 11:
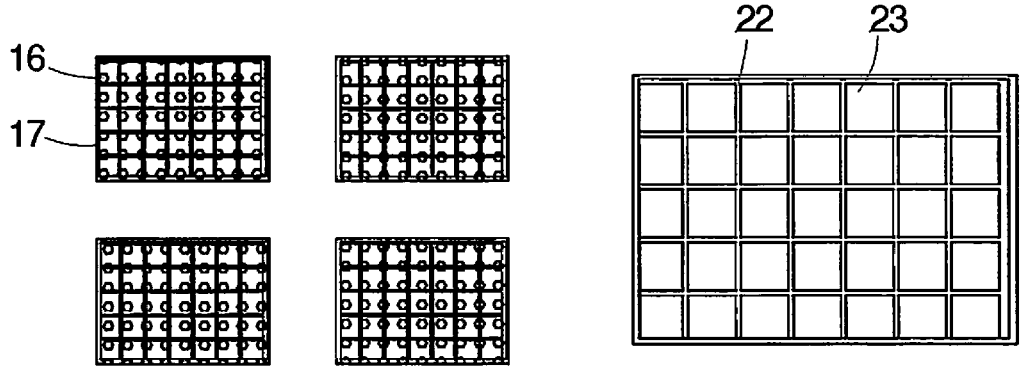
Figure 12:
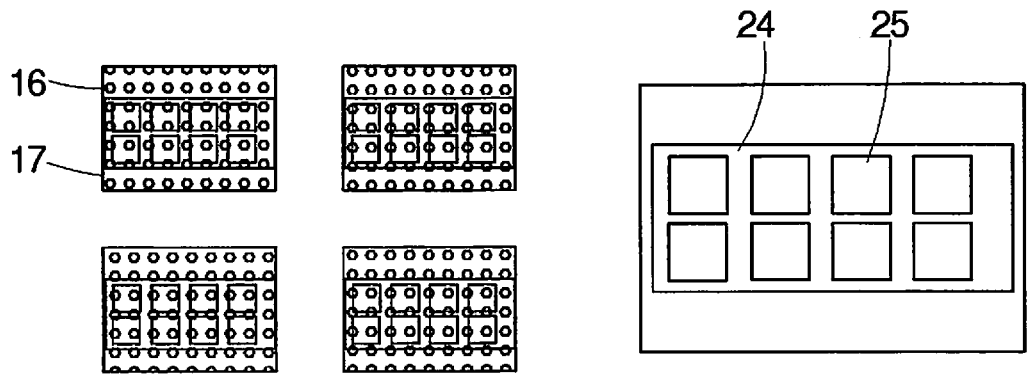

Another configuration of the method is lastly explained below with reference to FIGS. 10-12. Here, different illuminations are not produced by way of different illumination patterns, but by way of a lateral movement of the sample carrier 1 relative to the illumination pattern 3 between two recordings. With respect to FIG. 1, this corresponds to a movement that is perpendicular to the optical axis. It is possible here either to move the sample carrier 1 relative to the illumination pattern 3 or the other way round, but it is also possible for both to be moved in relation to one another. Typically, movement of the sample carrier 1 alone is easier to realize because the sample carrier is typically mounted on a stage that is displaceable in all three spatial directions. The LEDs 16 of the LED array 17 are switched in a fixed pattern, for example in a regular grid. The illumination pattern 3 and/or the sample carrier 1 is moved between two overview raw images in a plane that is orthogonal to the optical axis of the camera. In FIGS. 10-12, different sample carriers are illustrated in each case in four different positions of the illumination pattern 3 relative to the sample carrier 1, which is realized with the LED array 17 and the LEDs 16. The sample carrier in FIG. 10 used is a slide 20 with cover slips 21, which are to be made visible; in FIG. 11, it is a multiwell plate 22, the wells 23 of which are to be made visible; and in FIG. 12, the sample carrier is a chamber slide 24, the chambers 25 of which are to be made visible. The overview contrast images in all cases are illustrated on the right-hand side of the figures. Overview contrast images can here be produced both in bright-field mode and in dark-field mode. For an overview contrast image in the dark-field made, the calculation algorithm used is the minimum projection as a special case of the ranking projection, and in the case of an overview contrast image in the bright-field mode, a maximum projection can be used. To compensate for brightness differences, it is possible here, as also in all other cases where it is deemed necessary, to perform a shading correction after the calculation. In the case of a calculation that is based on segmentation, the shading correction can also be performed before the overview raw images are subjected to the calculation.

On account of the relative movement between the recordings of the overview raw images, it is necessary to know for the correct application of the calculation algorithm how the sample carrier or the illumination pattern 1 moves in the image. To this end, it is necessary to calibrate the camera or the detection optical unit 2 relative to the sample carrier 1 or to a stage on which it is mounted so as to be able to map the sample carrier coordinates onto image coordinates, and vice versa. To this end, initially a calibration pattern is used instead of the sample carrier at the same position or clamped onto the stage. In this way, it is possible to estimate such a mapping—a homography, that is to say a mapping of a two-dimensional plane onto a two-dimensional plane in space. It is of course also possible to dispense with a calibration if the relative movement can be ascertained by an image analysis or using a separate measurement system, or it is possible to perform calibration in advance based on objective parameters and distances.

The overview contrast images that have been determined with statistical illumination patterns provide the best contrast in terms of quality, in particular when using LEDs, because the switched-off LEDs in the case of the dynamic patterns, that is to say in which the patterns change, can provide quite a strong background signal on account of back-reflections at the sample carrier. Using corresponding image processing algorithms, for example with deep learning algorithms, these artefacts can, however, be eliminated in the evaluation, that is to say they will not be taken into account.

One further possibility for using statistical patterns to produce different illuminations, without laterally moving the sample or the sample carrier 1 relative to the illumination pattern, is to combine an overview contrast image from a plurality of recordings that were taken with different exposures, in the manner of a HDR (high dynamic range) recording. It is possible to combine an overview contrast image as a HDR image from for example three overview raw images which are recorded with different exposures.

It is possible here when calculating the overview contrast image to additionally take into account the position of the illumination elements with respect to the sample or the sample carrier, as explained in connection with FIG. 3. If the illumination element directly illuminate the sample carrier or the sample, bright-field information is used, and if not, dark-field information. In this way, the overview contrast image is a mixture of bright-field and dark-field contrasts.

The calibration pattern described above in connection with the calibration of the relative movement can additionally be used to effect a correction of geometric distortions in the image, applied to each overview contrast image. In addition, it is also possible to eliminate background artefacts by calculation.

After the production of the overview contrast images, they are automatically analyzed using an image evaluation algorithm, preferably with an algorithm based on deep learning using neural networks. For example, the type of the sample carrier is identified, the sample carrier can also be located in the image. If the sample carrier carries an inscription, said inscription can likewise be determined from the contrast image. The same is true for the sample or regions on the carrier, such as wells that can contain samples. By detecting air bubbles or other artefacts by way of corresponding image evaluation algorithms, it is possible in particular in the case of sample carriers that include a plurality of samples in separate containers to reduce the examination time taken for the sample carrier if such artefacts are present there. Finally, it is possible using the image evaluation of the overview contrast image in the case of an immersion liquid to also detect the volume and the form of an immersion drop, and it is also possible to draw conclusions relating to contamination of the immersion liquid.

This information can preferably be displayed to an observer or user on the PC by way of graphic means, such that the user can adapt his further procedure to the results of the analysis of the overview contrast image. Although it may be sufficient under certain circumstances in the case of operation by a user to present the overview contrast image to said user alone, it is also possible to use the information obtained using the image evaluation in particular for automated control of sample examinations with the microscope used. The overview contrast image provided to the user can use the control for navigating on the sample to prepare the further examinations. The information of the overview contrast image that is extracted using the image processing algorithms can, however, also make possible a robust subsequent processing which identifies and localizes for example automatically relevant structures of the sample carrier—such as the glass slides—or relevant structures of the samples on the sample carrier—such as tissue sections, organisms, or cells—for example to set a fully automated coarse positioning of the sample in all three spatial directions. Finally, the extracted image information also permits a more robust, faster and more efficient automated microscopy—such as high-throughput microscopy—with smaller data volumes and shorter recording times with automatic exclusion of error sources.

LIST OF REFERENCE SIGNS

1 Sample carrier
2 Detection optics
3 Illumination pattern
4 Surface detector
5 Calculation unit
6 Image evaluation unit
7 Control unit
8 LED array
9 Deflection mirror
10 Beam splitter
11 Lens element
12 Eyepiece
13 LED
14 First field region
15 Second field region
16 LED
17 LED array
18 Blue LED
19 Red LED
20 Slide
21 Cover slip
22 Multiwell plate
23 Well
24 Chamber slide
25 Chamber

The invention claimed is:

1. A method for producing and analyzing an overview contrast image of a sample carrier or of samples arranged on said sample carrier or of both the sample carrier and the samples arranged on said sample carrier, comprising:
   illuminating the sample carrier, which is arranged at least partially in a focus of a detection optical unit, in transmitted light with a two-dimensional, array-type illumination pattern,
   detecting at least two overview raw images with different illuminations of the sample carrier,
   choosing a calculation algorithm that is used to calculate the overview contrast image with an increased contrast or an improved signal-to-noise ratio from the at least two overview raw images in dependence on information that is to be extracted from the overview contrast image, and
   choosing an image evaluation algorithm that is used to extract the information from the overview contrast image in dependence on information that is to be extracted from the overview contrast image.

2. The method as claimed in claim 1, further comprising producing illumination patterns using an array having same-sized illumination elements, wherein the individual illumination elements are in each case distinguishable from one another in the at least two overview raw images.

3. The method as claimed in claim 2, wherein the illumination elements used are light emitting diodes (LED), organic light emitting diodes OLED), optical fibers, elements of an illuminated digital micromirror device (DMD) or of a spatial light modulator (SLM).

4. The method as claimed in claim 1, further comprising-producing the different illuminations by laterally moving the sample carrier relative to the illumination pattern between two recordings or by using different exposure times for the detection.

5. The method as claimed in claim 4, further comprising combining the individual contrast images that each show different regions of the sample carrier or the sample or of both the sample carrier and the sample to form the overview contrast image.

6. The method as claimed in claim 2, further comprising producing the different illuminations using different illumination patterns, which are chosen in dependence on the information that is to be extracted.

7. The method as claimed in claim 6, wherein producing different illumination patterns includes driving the illumination elements individually or in groups, and switching to produce different illumination patterns, wherein a first portion of the illumination elements is switched to emit light and at least a second portion of the illumination elements is switched to emit no light or to emit light of a different color or light of a different polarization.

8. The method as claimed in claim 7, wherein the different illumination patterns are produced by:
stochastically choosing the first portion of the illumination elements for each illumination pattern, or
stochastically choosing the first portion of the illumination elements having a chessboard-type or a different regular distribution, the different regular distribution being a cross-shaped distribution or a half pupil distribution in the array.

9. The method as claimed in claim 8, comprising stochastically choosing the first portion of the illumination elements having a chessboard-type or a different regular distribution, in which the second portion of the illumination elements does not emit light, and at least two overview raw images are recorded with mutually complementary illumination patterns.

10. The method as claimed in claim 8, comprising stochastically choosing the first portion of the illumination elements having a chessboard-type or a different regular distribution, in which all portions of the illumination elements emit light of colors or polarizations that differ from one another in pairs, further comprising recording simultaneously in an image a number of overview raw images, which corresponds to the number of portions, and subsequently separating the image by color channels or polarization.

11. The method as claimed in claim 6, wherein LEDs or OLEDs are used as the illumination elements, and the method further comprises producing stochastic illumination patterns by using pulse-width-modulated illumination elements having a pulse width that is selected to be longer than an integration time of a detector unit for recording the overview raw images.

12. The method as claimed in claim 6, wherein the illumination pattern is produced only in at least one section of the array of illumination elements, and the different illuminations are produced by scanning movement of the at least one section on the array, wherein the illumination elements outside the at least one section are switched to emit no light.

13. The method as claimed in claim 6, wherein the illumination elements are in the form of LEDs, wherein an LED is formed from three individual mutually adjacent sub-LEDs that each emit light in different primary colors red, green and blue, and different illuminations are set by the illumination from different angles in the primary colors.

14. The method as claimed in claim 1, further comprising choosing a calculation algorithm for producing an overview contrast image in a dark-field or bright-field mode in dependence on selection of an illumination method.

15. The method as claimed in claim 14, wherein:
the calculation algorithm is based on pixel-wise projection, including on a ranking projection or on a projection of statistical moments, wherein, for producing the overview contrast image from a stack of at least two overview raw images, the overview raw images are compared pixel by pixel, and the intensity value of one of the pixels for the corresponding position in the overview contrast image is chosen in accordance with a projection condition, or
the calculation algorithm is based on morphological operations with subsequent pixel-wise projection, including on a top-hat or black-hat transform with subsequent pixel-wise maximum projection, or
a calculation algorithm based on segmentation is selected, in which initially a determination is made for each pixel of an overview raw image as to whether it was irradiated directly with light by an illumination element, and said pixels are not taken into account for producing an overview contrast image in dark-field contrast mode.

16. The method as claimed in claim 2, further comprising performing a calibration for correcting geometric distortions using a recording and evaluation of a calibration pattern before the recording of overview raw images, wherein the calibration pattern is produced with the illumination elements of the array.

17. The method as claimed in claim 1, removing disturbing background signals from the overview contrast image before the evaluation.

18. The method as claimed in claim 1, further comprising:
introducing a diffusion screen between the array-type illumination pattern and the sample carrier, or switching a switchable diffusion screen to a diffusing mode, wherein the overview contrast image is produced in a bright-field mode.

19. The method as claimed in claim 1, the image evaluation algorithm chosen is a machine learning algorithm, the machine learning algorithm being a deep learning algorithm, which is trained on a basis of overview contrast images with known information.

20. The method as claimed in claim 19, further comprising:
using a deep learning algorithm based on a convolutional neural network to identify a type of the sample carrier,
performing a semantic segmentation for localizing structures of the sample carrier or of the sample, using a deep learning algorithm based on a fully convolutional network.

* * * * *

UNITED STATES PATENT AND TRADEMARK OFFICE
CERTIFICATE OF CORRECTION

| | |
|---|---|
| PATENT NO. | : 11,307,398 B2 |
| APPLICATION NO. | : 16/618773 |
| DATED | : April 19, 2022 |
| INVENTOR(S) | : Haase et al. |

It is certified that error appears in the above-identified patent and that said Letters Patent is hereby corrected as shown below:

In the Specification

In Column 10, Line 35, delete "(I)" and insert -- (i) --, therefor.

In Column 11, Line 1, delete "it" and insert -- its --, therefor.

In the Claims

In Column 20, Claim 3, Line 57, delete "(LED)," and insert -- (LEDs), --, therefor.

In Column 20, Claim 3, Line 58, delete "OLED)," and insert -- (OLEDs), --, therefor.

Signed and Sealed this
Second Day of August, 2022

Katherine Kelly Vidal
*Director of the United States Patent and Trademark Office*